United States Patent
Tanaka et al.

(10) Patent No.: US 10,189,212 B2
(45) Date of Patent: Jan. 29, 2019

(54) POROUS STAMP MATERIAL FOR LASER PROCESSING, POROUS STAMP USING THE SAME, AND METHOD OF MANUFACTURING THE SAME

(71) Applicants: Glory Industry Co., Ltd., Sennan, Osaka (JP); Sunlux Co., Ltd., Osaka (JP)

(72) Inventors: Yoshitomo Tanaka, Izumisano (JP); Masato Kitahara, Osaka (JP)

(73) Assignees: Glory Industry Co., Ltd., Osaka (JP); Sunlux Co., Ltd., Osaka (JP)

( * ) Notice: Subject to any disclaimer, the term of this patent is extended or adjusted under 35 U.S.C. 154(b) by 0 days.

(21) Appl. No.: 15/345,729

(22) Filed: Nov. 8, 2016

(65) Prior Publication Data

US 2017/0282625 A1   Oct. 5, 2017

(30) Foreign Application Priority Data

Apr. 5, 2016 (JP) ................................. 2016-076132

(51) Int. Cl.
*B41K 1/50* (2006.01)
*B29C 67/20* (2006.01)
(Continued)

(52) U.S. Cl.
CPC .............. *B29C 67/202* (2013.01); *B29B 9/06* (2013.01); *B29C 47/0009* (2013.01); *B29C 47/92* (2013.01); *B29C 47/0011* (2013.01); *B29C 47/0021* (2013.01); *B29C 47/0061* (2013.01); *B29C 2947/92704* (2013.01); *B29K 2023/06* (2013.01); *B29K 2023/12* (2013.01); *B29K 2101/12* (2013.01); *B29K 2223/083* (2013.01); *B29L 2031/767* (2013.01)

(58) Field of Classification Search
None
See application file for complete search history.

(56) References Cited

U.S. PATENT DOCUMENTS

| 5,397,417 A * | 3/1995 | Goto ..................... B29C 67/202 156/272.8 |
| 2014/0013974 A1 * | 1/2014 | Matsushita .............. B41K 1/40 101/333 |

FOREIGN PATENT DOCUMENTS

| DE | 69532063 T2 | 8/2004 |
| EP | 0997 313 A1 | 5/2000 |

(Continued)

OTHER PUBLICATIONS

Office Action in the corresponding Austrian application No. 4B A 51122/2016-1, dated Nov. 8, 2017.
(Continued)

*Primary Examiner* — Joshua D Zimmerman
(74) *Attorney, Agent, or Firm* — Kelly & Kelley, LLP

(57) ABSTRACT

The invention provides a porous stamp material for laser processing that is available for continuous extrusion molding. A material including at least 100 parts by weight of thermoplastic resin, 50-250 parts by weight of hydroxylated compound whose dehydration starting temperature is 100 to 500° C., and water-soluble pore-forming material that has 10-60 μm average particle diameter is mixed to obtain a mixed material. The obtained mixed material is extruded to obtain an extrusion molded product. The obtained extrusion molded product is processed with an aqueous solvent to elute the water-soluble pore-forming material, thereby yielding a porous stamp material that has continuous pores having 10-60 μm pore diameter. The obtained porous stamp material is laser-processed to manufacture a stamp.

17 Claims, 1 Drawing Sheet

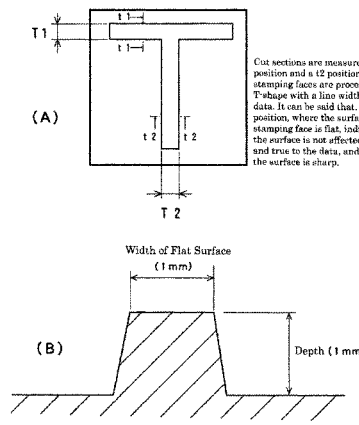

(51) Int. Cl.
    *B29C 47/00*     (2006.01)
    *B29B 9/06*     (2006.01)
    *B29C 47/92*     (2006.01)
    *B29K 101/12*     (2006.01)
    *B29L 31/00*     (2006.01)
    *B29K 223/00*     (2006.01)
    *B29K 23/00*     (2006.01)

(56) References Cited

FOREIGN PATENT DOCUMENTS

| | | |
|---|---|---|
| JP | 2000-006509 A | 1/2000 |
| JP | 2000-052630 A | 2/2000 |
| JP | 2000-335068 A | 12/2000 |
| JP | 2002-003665 A | 1/2002 |
| JP | 2002-265659 A | 9/2002 |
| JP | 2002-361992 A | 12/2002 |
| JP | 2003-246132 A | 9/2003 |

OTHER PUBLICATIONS

Martin Bonnet, "Kunststofftechnik: Grundlagen, Verarbeitung, Werkstoffauswahl und Fallbeispiele", book, published by the Springer-Verlag in 2009.

A capture of the article of Jul. 22, 2009 (https://web.archive.org/web/20090722183011/http://www.kimmel-kunststoffe.de/index.php?article_id=27).

* cited by examiner

[Fig.1]

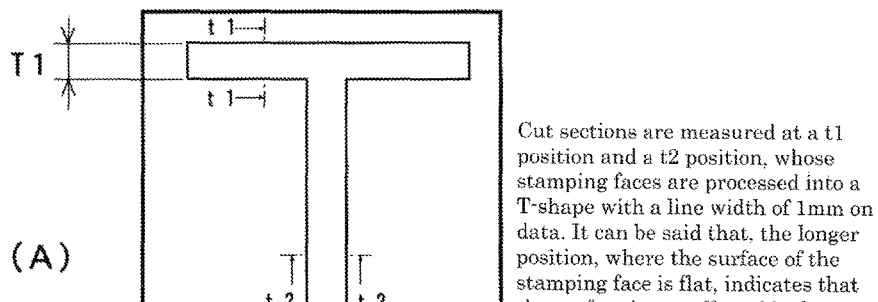

Cut sections are measured at a t1 position and a t2 position, whose stamping faces are processed into a T-shape with a line width of 1mm on data. It can be said that, the longer position, where the surface of the stamping face is flat, indicates that the surface is not affected by heat and true to the data, and the edge of the surface is sharp.

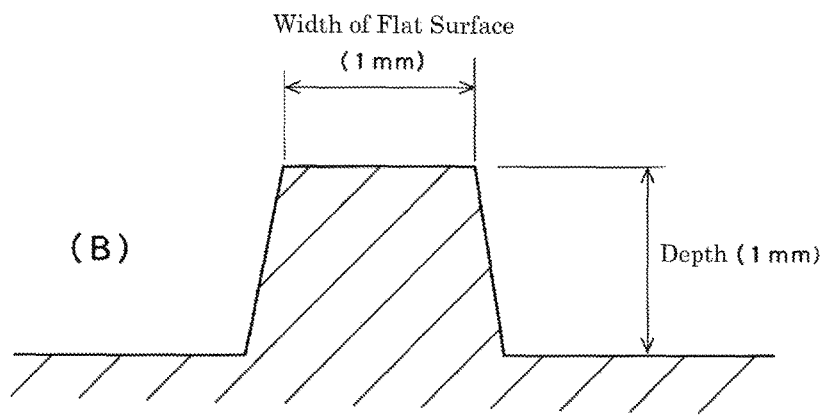

[Fig.2]

| Ratio of Aluminium Hydroxide(%) | T-Shaped Horizontal Line 1 mm (T 1) | T-Shaped Vertical Line 1 mm (T 2) |
| --- | --- | --- |
| 0 | 0.1 | 0 |
| 50 | 0.3 | 0.1 |
| 100 | 0.49 | 0.28 |
| 150 | 0.93 | 0.93 |
| 200 | 0.98 | 0.98 |
| 250 | 1.0 | 1.0 |

POROUS STAMP MATERIAL FOR LASER PROCESSING, POROUS STAMP USING THE SAME, AND METHOD OF MANUFACTURING THE SAME

TECHNICAL FIELD

The present invention relates to a porous stamp material for laser processing available for continuous extrusion molding, a porous stamp using the same, and a method of manufacturing the same.

BACKGROUND

Stamping faces of ink-containing stamp devices and ink penetration seals are formed by porous stamp materials including interconnected cells. Generally, vulcanized rubber, such as NBR (nitrile rubber), and thermosetting resins are used as a porous stamp material. Japanese Unexamined Patent Application Publication No. 2000-006509 and Japanese Unexamined Patent Application Publication No. 2000-335068 state that a thermoplastic resin is used for a stamp material. Some thermoplastic resins having cross linking agents added to improve heat resistance are also known. When a vulcanized rubber, a thermosetting resin, or a thermoplastic resin having a cross linking agent added is used as a stamp material, a press molding method is usually adopted for manufacture of a stamp. When a non-cross linked thermoplastic resin is used for a stamp, an extrusion molding method can be adopted for manufacture of a stamp.

As a means to form a desired stamping face (an imprint of a stamp) on the surface of the stamp made from porous stamp materials, a laser beam irradiation processing has been conventionally performed. Vulcanized rubber materials, such as NBR, enable high-precision laser processing, but emit an unpleasant smell at the time of processing, and thus require attachment of an air exhauster to a processing equipment. It is also required that the stamping face should be washed, because residues adhere on the stamping face after processing.

Porous stamp material made from thermoplastic resin without a cross linking agent enables extrusion molding, but is not appropriate for laser processing. This is because not only resins on laser beam-irradiated parts but also their surroundings melt before they burn and evaporate, and thus it is not possible to form a stamping face with sharp edge (well-defined outline) using such a porous stamp material. An imprint of an ink-containing stamp device made with such a stamp has thinner lines than required and blurs its outline. Moreover, melting of the stamp material by laser radiation could possibly cause clogging phenomena in the stamp.

Japanese Unexamined Patent Application Publication No. 2002-361992 states a technique that enables laser processing of a thermoplastic resin as a stamp material. The technique in Japanese Unexamined Patent Application Publication No. 2002-361992 enables conventional laser processing by previously absorbing liquid substances such as water in a porous stamp material mainly comprising a thermoplastic material in the manufacture of a stamp by laser processing.

The porous stamp material described in Japanese Unexamined Patent Application Publication No. 2002-361992 comprises a 20 or more percent by mass of thermoplastic material, a rubber-like elastic substance, and a small amount of a vulcanizing agent as components. The thermoplastic material is thermoplastic resin or thermoplastic elastomer. The liquid substance absorbed in the porous stamp material is water, glycerol, ethylene glycol, propylene glycol, methyl alcohol, ethyl alcohol, and water based ink comprising water as a main component, or the like.

The technique described in Japanese Unexamined Patent Application Publication No. 2002-361992 solve the problem, which is a defect in formation of an imprint caused by the thermoplastic material affected by heat propagation at the time of laser processing, by previously absorbing in the porous stamp material the liquid substance such as water. The document also states significant effects that this technique enables conventional laser processing for the stamp material made from thermoplastic resin, resulting in a sharp imprint while generating no unpleasant smell at the time of laser processing, and leaves no laser processing residues on stamping face with the residues being taken up into the melted thermoplastic material, requiring no need for washing after the processing and resulting favorable stamping face condition.

SUMMARY OF THE INVENTION

Vulcanized rubber materials, such as NBR, which is commonly used as a porous stamp material, have the problems that they emit an unpleasant smell in laser processing and leave laser processing residues on the stamping face after processing.

The porous stamp material made from the thermoplastic resin that does not contain a cross linking agent as described in Japanese Unexamined Patent Application Publication No. 2000-006509 and Japanese Unexamined Patent Application Publication No. 2000-335068 has the problem that laser processing is not available.

The technique in Japanese Unexamined Patent Application Publication No. 2002-361992 allows laser processing of thermoplastic resin as a stamp material, while it has the problem that it requires a step of previously absorbing in a porous stamp material a liquid substance such as water, thereby lowering production efficiency, and also requires an equipment to help absorb the liquid substance in the material, thereby increasing manufacturing cost.

There is another problem that a vulcanized rubber and a thermosetting resin in Japanese Unexamined Patent Application Publication No. 2002-361992 are cross-linked, and thus the stamp using them as a stamp material can be manufactured only by press molding but not by extrusion molding.

It is an object of the present invention to provide a porous stamp material for laser processing made from thermoplastic resin that is available for continuous extrusion molding without cross-linking the molding material. It is another object to provide a porous stamp using such a porous stamp material. It is another object to provide a method of manufacturing the porous stamp.

SUMMARY OF THE INVENTION

To achieve the above-described purpose, the present invention according to first aspect provides a porous stamp material consisting of a porous substance having continuous pores having 10-60 μm pore diameter and comprising a thermoplastic resin and 50-250 parts by weight of hydroxylated compound with respect to 100 parts by weight of the thermoplastic resin, wherein the starting temperature of dehydration of the hydroxylated compound is 100 to 500° C.

According to the present invention of second aspect, the above-described hydroxylated compound is aluminum hydroxide or magnesium hydroxide.

According to the present invention of third aspect, the above-described hydroxylated compound has an average particle diameter of 5 μm or less.

According to the present invention of fourth aspect, the porous stamp is manufactured with the use of the porous stamp material described in any of the first to third aspects.

The present invention according to fifth aspect provides a method of manufacturing a porous stamp, comprising:

a) mixing a material including at least 100 parts by weight of thermoplastic resin, 50-250 parts by weight of hydroxylated compound whose dehydration starting temperature is 100 to 500° C., and water-soluble pore-forming material that has 10-60 μm average particle diameter, thereby obtaining a mixed material, b) performing extrusion molding using the obtained mixed material to obtain an extrusion molded product, c) processing the obtained extrusion molded product with an aqueous solvent and eluting the water-soluble pore-forming material from the processed product to obtain a porous stamp material that has continuous pores having 10-60 μm pore diameter, and, d) manufacturing a stamp by laser processing of the obtained porous stamp material.

The present invention of the first aspect provides a porous stamp material containing a thermoplastic resin, wherein the porous stamp material comprises 50-250 parts by weight of hydroxylated compound with respect to 100 parts by weight of the thermoplastic resin, and wherein the starting temperature of dehydration of the hydroxylated compound is 100 to 500° C. In the present invention, the hydroxylated compound exist in an appropriate amount with respect to the thermoplastic resin, and the starting temperature of dehydration of the hydroxylated compound is set to be close to the melting or evaporating temperature of the thermoplastic resin. Then, when a stamp is manufactured by laser processing of the porous stamp material of the present invention, the thermoplastic resin on laser-irradiated parts evaporates and the hydroxylated compound dehydrates and decomposes. The endothermic reaction and vaporization reaction of water that occurred at that time inhibits increase in the surrounding temperature, which accordingly inhibits melting of the thermoplastic resin other than that of the laser-irradiated parts and ensure the formation of the stamping face that has well-defined outline.

According to the invention of the second aspect, it is possible to implement the present invention at a lower cost by selecting inexpensive and easily available aluminum hydroxide or magnesium hydroxide as the hydroxylated compound. In particular, the aluminum hydroxide has an advantage of being available for the thermoplastic resin that has a lower melting point, since the starting temperature of dehydration by thermolysis is low, such as approximately 180° C. On the other hand, the magnesium hydroxide can be used for the thermoplastic resin that has a higher melting point, since the starting temperature of dehydration by thermolysis is high, such as approximately 400° C.

According to the invention of the third aspect, it is possible to bind a hydroxylated compound to a substrate of the stamp material consisting of the thermoplastic resin by selecting the hydroxylated compound whose particle has an average particle diameter of 5 μm or less. The average particle diameter of the hydroxylated compound is preferably smaller and desirably 1 μm or less. If the average particle diameter of the hydroxylated compound is larger than 5 μm, there is a possibility that the hydroxylated compound can be eluted when the pore-forming material is eluted by an aqueous solvent after molding.

According to the invention of the fourth aspect, the stamp is manufactured by using the porous stamp material of any one of the aspects 1 to 3. Accordingly, it is also possible to manufacture a stamp having well-defined outline by using laser processing.

According to the invention of the fifth aspect, it is possible to manufacture a stamp that has well-defined outline by a method of manufacturing a stamp, comprising; mixing a material including at least 100 parts by weight of thermoplastic resin, 50-250 parts by weight of hydroxylated compound whose dehydration starting temperature is 100 to 500° C., and water-soluble pore-forming material that has 10-60 μm average particle diameter, thereby obtaining a mixed material; performing continuous extrusion molding using the obtained mixed material which does not include cross-linking reaction, to obtain an extrusion molded product; processing the obtained extrusion molded product with an aqueous solvent and eluting the water-soluble pore-forming material from the processed product to obtain a porous stamp material that has continuous pores having 10-60 μm pore diameter; and, manufacturing a stamp by laser processing of the porous stamp material. The obtained porous stamp material contains hydroxylated compound that prevents the melting of the thermoplastic resin other than the laser-irradiated parts. Accordingly, it is possible to form a stamping face that has well-defined outline using such a porous stamp material.

BRIEF DESCRIPTION OF DRAWINGS

FIG. 1(A) shows an example of a stamping face of a stamp manufactured using the porous stamp material according to the present invention and FIG. 1(B) shows an enlarged sectional view of the stamp.

FIG. 2 is a table showing measured values of width dimensions of T1 and T2 in FIG. 1(A) depending on various blending amount of aluminum hydroxide.

DESCRIPTION OF THE PREFERRED EMBODIMENTS

The porous stamp material according to the present invention consists of a porous substance having continuous pores whose diameter is 10 to 60 μm, comprising a thermoplastic resin and 50 to 250 parts by weight of hydroxylated compound with respect to 100 parts by weight of the thermoplastic resin, wherein the dehydration starting temperature of the hydroxylated compound is 100 to 500° C.

An olefin based resin such as polyethylene and polypropylene, an ethylene-vinyl alcohol polymer (PEVA), an ethylene-glycidyl methacrylate copolymer (PEGM), or the like is used as a thermoplastic resin, but not particularly limited to.

A metal hydroxide such as aluminum hydroxide (dehydration starting temperature is about 180° C.) and magnesium hydroxide (dehydration starting temperature is about 400° C.) are preferably used as a hydroxylated compound, but not particularly limited to, as long as the dehydration starting temperature is 100 to 500° C. Also, a plurality of hydroxylated compounds can be used in combination, for example, aluminum hydroxide and magnesium hydroxide can be combined.

The hydroxylated compound produces thermolysis involving endothermic reaction by laser irradiation in laser processing and absorbs vaporization heat when water generated thereby evaporates into steam, thereby suppressing the ambient temperature rise and preventing thermoplastic resins other than those in a laser-irradiated part from melting.

The reason that the blending amount of the hydroxylated compound is 50 to 250 parts by weight with respect to 100 parts by weight of thermoplastic resin is as follows: if the amount is less than 50 parts by weight, the required amount of the hydroxylated compound becomes insufficient with respect to thermoplastic resin and unable to sufficiently absorb heat in laser processing, and thus melting of the thermoplastic resin around the laser-irradiated part cannot be prevented; and contrarily, even if the amount exceeds 250 parts by weight, heat-absorptive effect remains the same, and too much blending amount may cause deterioration in processing accuracy of the stamping face.

The average particle diameter of a hydroxylated compound is 5 µm or less, preferably 1 µm or less. The smaller the particle diameter is, the more its binding with the thermoplastic resin which is a substrate is ensured, and thus the hydroxylated compound does not easily fall off in processing with an aqueous solvent which will be described later.

A particulate water-soluble polymer substance which does not dissolve in polymer resin but does dissolve in an aqueous solvent is used as a pore-forming material. Further, it is desirable that a melting point of the pore-forming material is higher than a heating temperature in a kneading step or extrusion molding step which will be described later. The pore-forming material includes, but not limited to, for example, acid-soluble inorganic compounds such as calcium carbonate and magnesium carbonate, and salts, as well as polyhydric alcohol resins such as pentaerythritol (2.2-dihydroxymethyl-1.3-propanediol), starch such as corn starch, wheat starch, and potato starch, artificial sweeteners such as aspartame and saccharin, and polysaccharide such as hemicellulose. One kind of pore-forming material may be used alone, but also one or more kinds of pore-forming materials can be used.

An average particle diameter of the pore-forming material is set to be 10 to 60 µm. Accordingly, a pore diameter of the porous stamp material can be set to be 10 to 60 µm which is optimal as a stamp material. The blending amount of pore-forming materials is not particularly limited but adjusted according to porosity of the porous stamp material to be obtained. For example, when the porosity is 4-80%, it is preferable that 250 to 450 parts by weight of pore-forming materials are blended with respect to 100 parts by weight of thermoplastic resin.

Pore-forming auxiliaries are blended with the pore-forming materials as needed. The pore-forming auxiliaries are used for shortening the time for the pore-forming materials to elute in water, and it is preferable that they have a higher boiling point, can improve flowability of the resin in small amounts, and have small reduction of receiving-heat amounts. The pore-forming auxiliaries include, but not limited to, polyhydric alcohol monomer or polymer, specifically polyalkylene glycol and diethylene glycol, such as polyethylene glycol. They not only shorten the time for the pore-forming materials to elute in water, but also improve plasticity of the resin and increase the infiltration speed of ink. The blending amount of the pore-forming auxiliaries is not particularly limited, but preferably 30 to 150 parts by weight with respect to 100 parts by weight of thermoplastic resin. It is because that no effects can be obtained by the blending of less than 30 parts by weight of the pore-forming auxiliaries and no increase in effect can be seen even by the blending of more than 150 parts by weight of the pore-forming auxiliaries.

Furthermore, it is also possible to simultaneously blend a plasticizer. The plasticizer acts to decrease expansion rate of a porous stamp material. The plasticizer is preferable since it decreases the expansion rate of the porous stamp material after ink absorption and decreases expansion and deflection of the stamping face. Specifically, dioctyl phthalate (DOP), dioctyl adipate (DOA), and vulkanol, etc. are used as a plasticizer. 5 to 30 parts by weight of plasticizer is blended with respect to 100 parts by weight of thermoplastic resin when used.

A pigment may also be blended as needed. The pigment is considered to be used for colorizing a stamping face with a desired color or assorting an image part and non-image part of the stamping face by color.

Next, described below is a method of manufacturing a porous stamp material according to the present invention. First, 100 parts by weight of thermoplastic resin, 50 to 250 parts by weight of hydroxylated compound with 100 to 500° C. of dehydration starting temperature, water-soluble pore-forming material with an average particle diameter of 10 to 60 µm, and, if desired, a pore-forming auxiliary are prepared and kneaded to afford a mixed material. A kneading temperature is, not particularly limited but, appropriately set depending on a kind of thermoplastic resin to be used, i.e., usually 130 to 180° C.

Then, the obtained mixed material is extruded by an extruder. The present invention does not comprise a cross-linking step required for manufacturing a conventional porous stamp material, thereby allowing for continuous extrusion molding of the mixed material. A shape of an extrusion molded product is not particularly limited, but usually a sheet-like shape.

During the extrusion molding step, the mixed material is heated in order to maintain the plasticity, but this heating temperature needs to be lower than a thermolysis temperature of the blended hydroxylated compound. Therefore, a retention temperature and an extrusion temperature of the mixed material within the extruder are set within the range of equal to or more than the softening temperature of the thermoplastic resin and less than the thermolysis temperature of the hydroxylated compound.

Then, after the obtained extrusion molded product is cut into an appropriate size as needed, it is treated with an aqueous solvent to elute a water-soluble pore-forming material. The aqueous solvent includes water, warm water, water-soluble lower aliphatic alcohol, dilute acid water, and dilute alkaline water, etc. Usually, water or warm water is preferable. In addition, acid or alkali is preferably used at as low concentration as possible when used as an aqueous solvent. Also, treatment with the aqueous solvent includes treatment to immerse and stir the extrusion molded product in the aqueous solvent, treatment to immerse the extrusion molded product in a flowing aqueous solvent, or the like.

The treatment with the aqueous solvent allows the pore-forming material and the pore-forming auxiliary to elute out of the extrusion molded product to produce a porous stamp material consisting of a porous substance having continuous pores and mainly comprising a thermoplastic resin and a hydroxylated compound. Since the average particle diameter of the pore-forming material is 10 to 60 µm, the pore diameter of the porous substance can be 10 to 60 µm. An average pore diameter of a porous substance can be calculated through a pore distribution measurement by a mercury press-in method, a gas absorption method by a nitrogen gas absorber, or the like.

The obtained porous stamp material receives dehydrating and drying treatments and then is used for manufacturing a printing plate by laser processing. In a laser processing, at a laser beam-irradiated part in the porous stamp material, the thermoplastic resin evaporates with heat and the hydroxylated compound pyrolytically decomposes, generating dehydration reaction. Then, endothermic reaction in thermolysis of the hydroxylated compound and vaporization reaction of the generated water occur, thereby suppressing the temperature rise around the laser-irradiated part to prevent thermoplastic resins in the surrounding part from melting. As a result, the boundary between the melted part and the non-melted part of the thermoplastic resin is clearly defined, thereby ensuring formation of a stamping face having a well-defined outline.

The conventional stamp material for laser processing uses a thermoplastic resin where crosslinking treatment was carried out for improving heat resistance, a vulcanized rubber with high heat resistance, or the like. Therefore, when the stamp material is irradiated with laser beam for forming a stamping face, it often burns and evaporates to generate gas and smoke having an unpleasant smell. The generated gas can negatively impact the human body and corrode a machine or device, etc. Burning residues of the stamp material are also generated. Accordingly, laser processing facilities for the conventional stamp material require an air exhauster for gas and smoke and a removable device for the burning residues, resulting in an increase in equipment cost.

On the other hand, since the porous stamp material of the present invention has main substances of a thermoplastic resin and a hydroxylated compound and does not involve crosslinking reaction, it generates little gas or smoke in laser processing and produces little scattering of residues. Therefore, the present invention can eliminate the need for or simplify the air exhauster and the removable device for the residues. And thus it can simplify the circumference of the laser processing facilities and also has an advantage of reduction of manufacturing and equipment costs.

In addition, since the porous stamp material according to the present invention does not involve crosslinking reaction, it is possible to reuse defective goods made, for example, in the extrusion molding as a return material. Accordingly, the disposal volume in the manufacturing process can be decreased, resulting in a reduction of a production cost, and restraining an amount of waste to reduce a load to environment.

Example 1

2 kg of olefin based elastomer as a thermoplastic resin, 3.2 kg of aluminum hydroxide as a hydroxylated compound, 7.5 kg of pore material, and 1.7 kg of polyethylene glycol as a pore forming auxiliary were kneaded at 10 litter kneader setting: 150° C. for 15 minutes and formed into a pellet shape by a twin-screw extruder. The formed pellet was extruded by the extruder under the conditions of extrusion rate: 50 kg/hour and cylinder temperature: 130° C. or less to obtain a sheet-like extrusion molded product. The obtained sheet-like extrusion molded product was washed while being stirred using 40° C. of warm water until the concentration of the pore material in water became undetectable. Subsequently, it was dehydrated by a roller and then dried with 40° C. of warm air by a dryer to produce a porous stamp material consisting of a porous substance whose main substances are an olefin based elastomer and aluminum hydroxide.

The obtained porous stamp material had continuous pores whose pore diameter is 17 μm.

Example 2

With respect to the porous stamp material according to the present invention which was manufactured according to Example 1, a relationship between a blending ratio of the aluminum hydroxide and a definiteness of the outline of the stamping face formed by the laser processing was examined. A test method comprises manufacturing a plurality of porous printing plates with different blending amount of aluminum hydroxide, and irradiating laser to form a T-shape of a relief printing plate, preferably having 1 mm in width and 1 mm in height on each porous printing plate, as shown in (A) and (B) of FIG. 1. Then, a width dimension T1 in t1 cross section of the horizontal line (width of the flat surface) and a width dimension T2 in t2 cross section of the vertical line (flat amount of the surface) of T-shape on the actually manufactured stamping face were measured.

In this test, the porous stamp material around the targeted T-shape part was evaporated by laser irradiation to form a stamping face. If the stamping face is affected by heat through laser irradiation, it is believed that the thermoplastic resin melts even in the boundary area between the laser-irradiated part and non-irradiated part, resulting in a vague outline of the boundary. Therefore, it can be determined that, the closer the values of the flat amount T1 and T2 of the surface of the stamping face are to 1 mm, the less the face is affected by heat through laser irradiation and the better the outline is defined.

The test results are as shown in FIG. 2. In FIG. 2, the ratio (%) of aluminum hydroxide is a value of the blending amount with respect to 100 parts by weight of thermoplastic resin. In the comparative example where aluminum hydroxide is not blended (0%), heat through laser irradiation simultaneously melted the non-irradiated part as well, and thus most parts of the stamping face could not be formed. It is shown that blending 50 parts by weight of aluminum hydroxide leaves the non-irradiated part in the stamping face and thus the impact of heat on the non-irradiated part can be eased. Also, it is understood that blending 150 or more parts by weight of aluminum hydroxide produces a remarkable effect of suppressing the impact of heat on the non-irradiated part, and blending 250 parts by weight of aluminum hydroxide makes this effect reach its upper limit.

Other Example

In the above-mentioned example, aluminum hydroxide is blended with an olefin based elastomer to ease the impact of heat by laser irradiation. Other hydroxylated compounds can be also used depending on a kind of thermoplastic resin. For example, for thermoplastic resins, such as various kinds of engineering plastics with a high melting point, a hydroxylated compound with high dehydration starting temperature such as magnesium hydroxide may be used.

Moreover, in the above-mentioned example, the porous stamp material was manufactured by the extrusion molding method. It is also possible to adopt the general methods of molding a thermoplastic resin, such as an injection molding, blow molding, and calender molding.

INDUSTRIAL APPLICABILITY

The porous stamp material according to the present invention is not only used for a printing plate for a stamp, but also for a printing plate for an ink penetration seal, an etching member for a printed circuit board, a precise primer processing member for a rubber or metal, and a printer head of a press, etc.

The invention claimed is:

1. A porous stamp material consisting of a porous substance having continuous pores having 10-60 μm pore diameter and comprising a non-crosslinked thermoplastic resin and 50-250 parts by weight of hydroxylated compound with respect to 100 parts by weight of the thermoplastic resin, wherein the starting temperature of dehydration of the hydroxylated compound is 100 to 500° C.

2. The porous stamp material according to claim 1, wherein said hydroxylated compound is aluminum hydroxide or magnesium hydroxide.

3. A porous stamp manufactured with the use of the porous stamp material of claim 1.

4. A porous stamp manufactured with the use of the porous stamp material of claim 2.

5. The porous stamp material according to claim 1, wherein the hydroxylated compound has an average particle diameter of 1 μm or less.

6. A porous stamp material consisting of a porous substance having continuous pores having 10-60 μm pore diameter and consisting of a non-crosslinked thermoplastic resin and 50-250 parts by weight of hydroxylated compound with respect to 100 parts by weight of the thermoplastic resin, wherein the starting temperature of dehydration of the hydroxylated compound is 100 to 500° C.

7. The porous stamp material according to claim 6, wherein said hydroxylated compound is aluminum hydroxide or magnesium hydroxide.

8. A porous stamp manufactured with the use of the porous stamp material of claim 6.

9. A porous stamp manufactured with the use of the porous stamp material of claim 7.

10. The porous stamp material according to claim 6, wherein the hydroxylated compound has an average particle diameter of 1 μm or less.

11. A porous stamp material consisting of a porous substance having continuous pores having 10-60 μm pore diameter and consisting of a non-crosslinked thermoplastic resin, 50-250 parts by weight of hydroxylated compound with respect to 100 parts by weight of the thermoplastic resin, wherein the starting temperature of dehydration of the hydroxylated compound is 100 to 500° C., and 5-30 parts by weight of plasticizer with respect to 100 parts by weight of the thermoplastic resin.

12. The porous stamp material according to claim 11, wherein said hydroxylated compound is aluminum hydroxide or magnesium hydroxide.

13. The porous stamp material according to claim 11, wherein said plasticizer is dioctyl phthalate, dioctyl adipate, or vulkanol.

14. A porous stamp manufactured with the use of the porous stamp material of claim 11.

15. A porous stamp manufactured with the use of the porous stamp material of claim 12.

16. A porous stamp manufactured with the use of the porous stamp material of claim 13.

17. The porous stamp material according to claim 11, wherein the hydroxylated compound has an average particle diameter of 1 μm or less.

* * * * *